Patented June 3, 1941

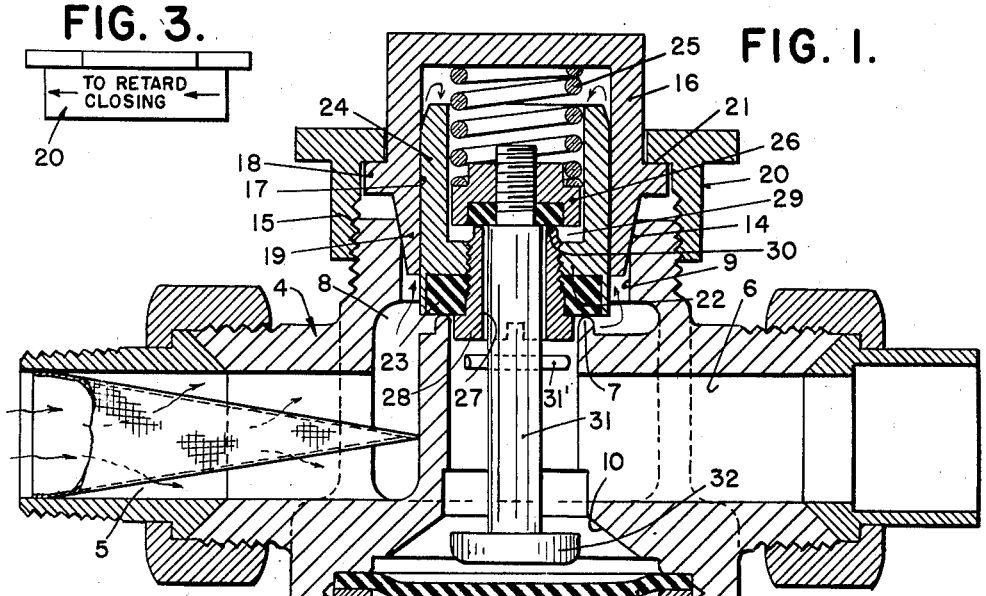
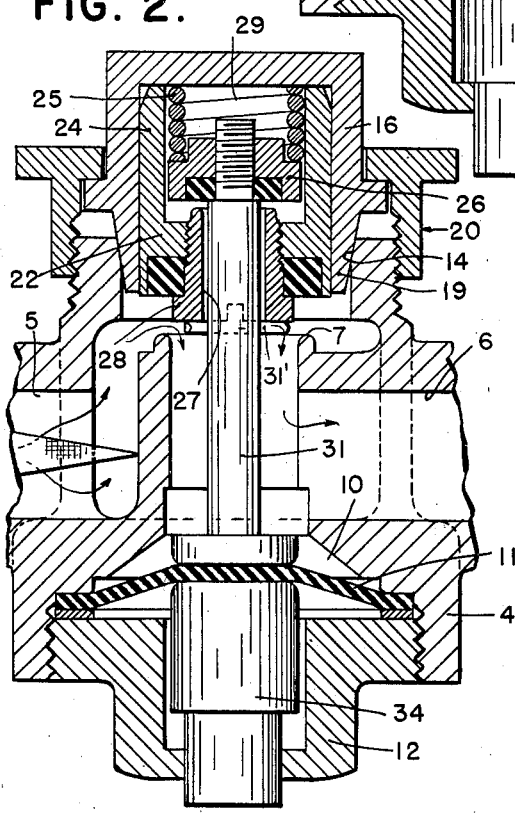
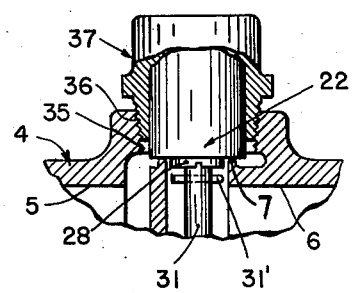

2,243,957

UNITED STATES PATENT OFFICE 2,243,957

VALVE

Herman E. Heine and Howard G. Mullett, Milwaukee, Wis., assignors to Bradley Washfountain Company, Milwaukee, Wis., a corporation of Wisconsin Application December 11, 1939, Serial No. 308,515

6 Claims. (Cl. 137—139)

The invention relates to valves and more particularly to valves of the flushing valve type.

One of the principal objects of the invention is to provide a valve whose closing period may be varied by varying the clearance between the main valve stem and its casing through means adjustable exteriorly of the casing. More particularly, the invention includes a cylindrical guide for the stem of the valve, the bore of said guide being adjustable in diameter by means of an adjustable wedge connection with the casing.

The invention further consists in the several features hereinafter set forth and more particularly defined by claims at the conclusion hereof.

In the drawing:

Fig. 1 is a vertical sectional view of a valve embodying the invention, showing it in closed position;

Fig. 2 is a view similar to Fig. 1, showing the valve in open position, parts being broken away;

Fig. 3 is a detailed elevational view of the adjusting nut;

Fig. 4 is a detailed sectional view showing certain modifications.

Referring to the drawing, the numeral 4 designates a casing having an inlet passage 5 and an outlet passage 6 and a valve-controlled seat 7 between said passages, the passage 5 having an annular portion 8 adjacent said seat with a bore 9 extending therefrom, the passage 6 having a laterally offset bore 10 which is axially aligned with the seat 7 and is closed off by a flexible diaphragm 11 which is secured in position by a nut 12 having threaded engagement at 13 with said casing 4.

The bore 9 of the casing has a tapered upper end portion 14, and said casing has a threaded exterior 15 adjacent thereto.

A valve stem guide member 16 is in the form of a cap with a cylindrical guide bore 17, an annular flange 18, and a tapered end portion 19 whose tapered side engages the tapered part 14 of the casing 4 and is adjustably clamped relative thereto by a sleeve nut 20 which is in threaded engagement with the thread portion 15 of the casing and has a flange 21 engaging the annular flange 18 of said member 16.

The valve seat 7 is engaged by a closing valve 22 which has a composition seat portion 23 engaging the seat 7 and a cylindrical sleeve stem portion 24. This valve is normally held to its seat by water pressure and by pressure of a spring 25 which is also associated with a pilot valve 26 as hereinafter described.

The head of the valve 22 has a passage 27 extending therethrough formed by the bore of an annular nut member 28 which connects the outlet passage 6 with space 29 formed in the cap or guide member 16, and this bore or passage 27 is normally shut off by the pilot valve 26 which is urged against its seat 30 by the spring 25 which is interposed between said valve and the top of said member 16 and water pressure acting on said valve. The valve 26 has a stem 31 which extends down through the passage 27 and into the outlet 6 and into the offset portion 10 with a head part 32 disposed adjacent the diaphragm 11.

The nut 12 has a centrally disposed bore 33 formed therein in which an operating button 34 is slidably mounted and adapted to engage the diaphragm 11 and move the same upwardly into engagement with the head 32 of the stem 31 of the valve 26 so as to lift said valve off its seat 30 and thus allow water in the space 29 in the hollow of the stem 24 of the valve 22 to flow therefrom into the outlet passage and thus allow the unbalanced water pressure from the inlet side acting on the outer annular area formed between the outer side of the seat 7 and the exterior of the stem 24 to lift said valve 22 off its seat 7 and allow water to flow freely from the inlet 5 to the outlet 6, it being noted that under these conditions the lifting of the valve 26 against the pressure of the spring 25 relieves the valve 22 of the pressure of said spring since said spring normally acts through said valve 26 against the head of the valve 22. After the valve 22 is opened as above described, it will stay open under the action of water pressure until on the closing of the valve 26 under the action of the spring 25 the water pressure is again allowed to build up in the space 29 through the passage of the water in the clearance space between the bore 17 and the stem of the valve, and depending upon the size of this clearance space will depend the time that it takes the valve 22 to close. Thus increasing the clearance between the bore 17 and the stem 24 of the valve 22 will cause said valve to close more quickly than when said clearance space is decreased. For adjusting the clearance space between the valve 22 and the member 16 the tapered fit provided by the tapered bore 14 and the tapered end 19 permits the lower end of the bore 17 to be contracted or expanded by putting pressure on said member 16 by means of the adjusting nut 20 so as to contract said lower end on the tightening of said nut and by relieving the pressure on said member 16 by loosening said nut and allowing the reaction of the spring 25 and the action of the water pressure to push the member 16 outwardly relative to the casing 4. Thus by a simple turning adjustment of the nut 20 the member 16 may be contracted or expanded at its lower end to change the clearance between said end and the stem 24 of the valve 22 and thus change the closing time of said valve 22, it being understood that for any adjustment the guide 16 and the casing 4 are in sealing engagement with each other. Instead of a plain taper fit for the cap and guide member 16 with its separate adjusting nut, we may use the construction shown in Fig. 4 wherein the cap and guide member 37 which is similar in shape to the part 16 has a tapered threaded end at 36 engageable with the threaded bore 35, these parts being so related that as the member 37 is screwed inwardly into the bore 35, its lower end will be contracted, thus decreasing the clearance between the tubular stem 24 of the valve 22, and screwing the member 37 outwardly increases the clearance, the fit between the parts being sufficiently tight for any adjustment of the parts as to provide a fluid tight seal.

From the above it is to be noted that the space 29 forms a chamber in which the pressure of the water at the inlet side acts to hold the valve closed, this pressure being relieved on the opening of the pilot valve 26. Thus the space 29 may be considered a back pressure chamber, and the tapered adjustment for the guide member 16 a means for regulating the rate of filling of said back pressure chamber.

If for any reason the water pressure prevailing should be insufficient to lift the valve 22, we have provided the stem 31 of the pilot valve 26 with a cotter pin or stop portion 31' which on a sufficient movement of the stem 31 under the action of the diaphragm 11 and button 34 will engage the nut 28 of the valve 22 and thus act to manually lift said valve. Where a cotter pin is used as the stop 31', it will be understood that the same is prevented from dropping into the slots of the nut 28 by spreading the legs of said cotter pin.

We desire it to be understood that this invention is not to be limited to any particular form or arrangement of parts except in so far as such limitations are included in the claims.

What we claim as our invention is:

1. In an hydraulically operated valve, the combination of a valve casing provided with a liquid inlet, a liquid outlet, and a valve controlled passage between said inlet and outlet, a main control valve in said passage having a stem, a back pressure chamber communicating with said inlet and including a guide for said stem, means for contracting and expanding said guide relative to said stem to vary the clearance space therebetween to vary the rate of flow of liquid from said inlet to said back pressure chamber, a valve controlled passage between said back pressure chamber and said outlet, and an exteriorly operable pilot valve controlling said last named passage.

2. In an hydraulically operated valve, the combination of a valve casing provided with a liquid inlet, a liquid outlet, and a valve controlled passage between said inlet and outlet, a main valve in said passage having a stem, a back pressure chamber communicating with said inlet and including a guide for said stem, said guide having a tapered fit in said casing, and means for moving the tapered end of said guide relative to said casing to expand or contract said guide relative to said stem to vary the clearance between said stem and valve and thus vary the rate of passage of liquid from said inlet to said back pressure chamber, a valve controlled passage between said back pressure chamber and said outlet, and an exteriorly disposed pilot valve controlling said last named passage.

3. In an hydraulically operated valve, the combination of a valve casing provided with a liquid inlet, a liquid outlet, and a valve controlled passage between said inlet and outlet, a main valve in said passage having a stem, a back pressure chamber communicating with said inlet and including a guide for said stem, said guide having a tapered fit in said casing, and an exteriorly adjustable nut for controlling the position of said guide in said casing to control the effective diameter of said guide at its tapered portion and thus control the rate of passage of liquid from said inlet to said back pressure chamber, a valve controlled passage between said back pressure chamber and said outlet, and an exteriorly operable pilot valve controlling said last named passage.

4. In an hydraulically operated valve, the combination of a valve casing provided with a liquid inlet, a liquid outlet, and a valve controlled passage between said inlet and outlet, a main valve in said passage having a stem, a back pressure chamber communicating with said inlet and including a guide for said stem, means for contracting and expanding said guide relative to said stem to vary the clearance space therebetween to vary the rate of flow of liquid from said inlet to said back pressure chamber, said main valve having a passage therethrough to establish communication between said back pressure chamber and said outlet, and an exteriorly controlled pilot valve controlling said passage in said main valve.

5. In an hydraulically operated valve, the combination of a casing provided with a liquid inlet, a liquid outlet, a valve controlled passage between said inlet and said outlet and bores aligned with said passage and communicating with said inlet and outlet, respectively, a main valve in said passage having a stem, a back pressure chamber communicating with the bore connected with said inlet and including a guide for said stem, said guide having a tapered fit in said bore, exteriorly controlled means for exerting pressure lengthwise of said guide to expand or contract said guide through the action of said tapered fit with said bore to vary the clearance space between said guide and said stem to vary the rate of flow of liquid from said inlet to said back pressure chamber, said main valve having a passage therethrough to establish communication between said back pressure chamber and said outlet, a pilot valve controlling said passage in said main valve and provided with a stem extending across said outlet and into the bore communicating therewith, a diaphragm closing off the end of said last named bore and engageable with said stem of said pilot valve, and an exteriorly operable member for moving said diaphragm.

6. In an hydraulically operated valve, the combination of a casing provided with a liquid inlet, a liquid outlet, a valve controlled passage between said inlet and said outlet and having a bore communicating with said inlet and provided with a tapered outer end, a main valve in said passage having a stem of a diameter substantially equal to the head of said valve, a hollow cap member closing off the end of said bore and having a tapered end engaging the tapered end of said bore, said cap having a bore forming a guide for the stem of said valve and said bore forming a back pressure chamber communicating with the bore in said casing through the clearance between said bore in the cap and the stem of said valve, a nut adjustably mounted on the exterior of said casing and engageable with said cap to adjust the position of said tapered portion relative to said casing to vary the diameter of the bore in said cap, said main valve having a passage therethrough to establish communication between said back pressure chamber and said outlet, a pilot valve controlling said passage in said main valve and having a stem projecting into said outlet, a spring interposed between said pilot valve and said cap for normally closing said pilot valve and also acting on said main valve, and an exteriorly operable means for opening said pilot valve.

HERMAN E. HEINE.
HOWARD G. MULLETT.